Feb. 15, 1938.    G. MEYFARTH    2,108,382
INDIVIDUAL AXLE DRIVE FOR VEHICLES
Filed May 13, 1935    2 Sheets-Sheet 1
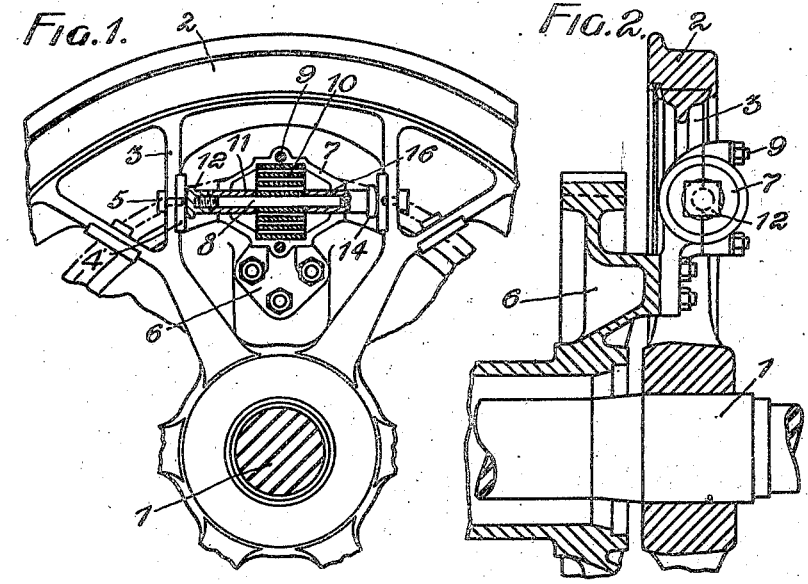
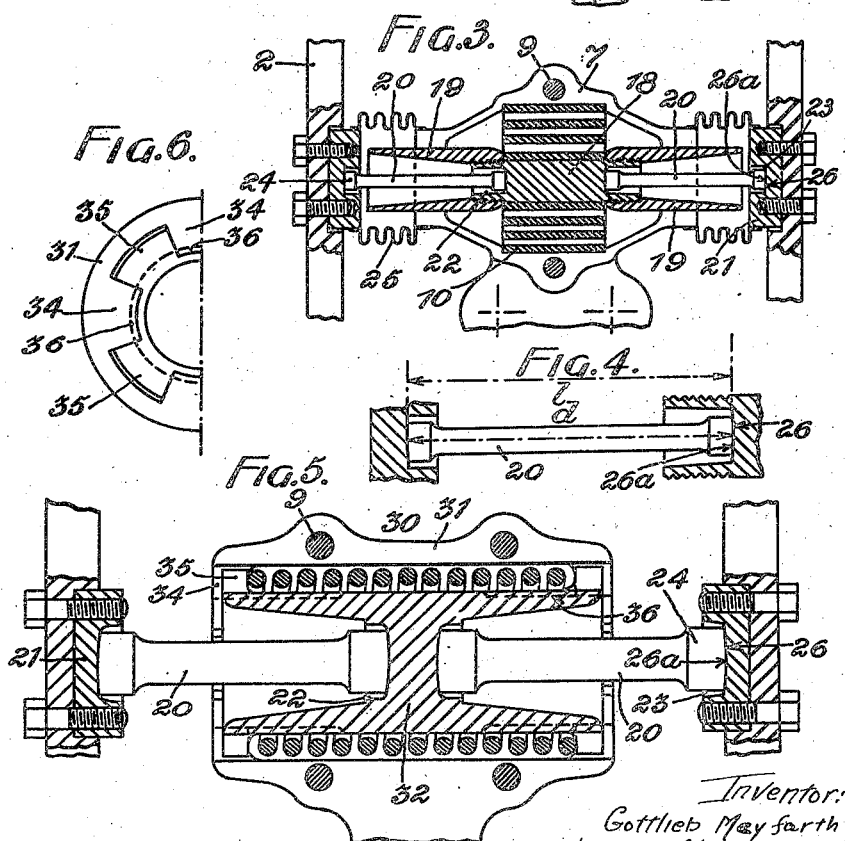
Inventor:—
Gottlieb Meyfarth

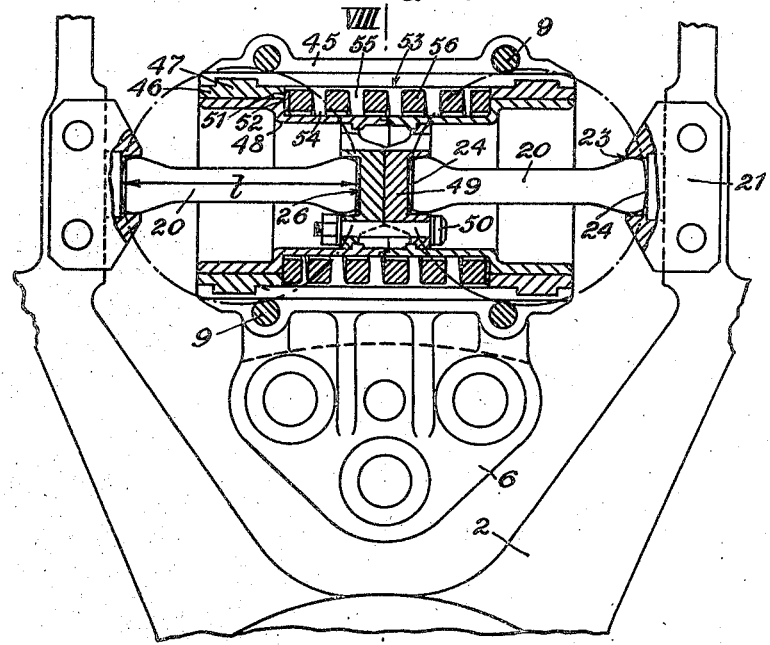
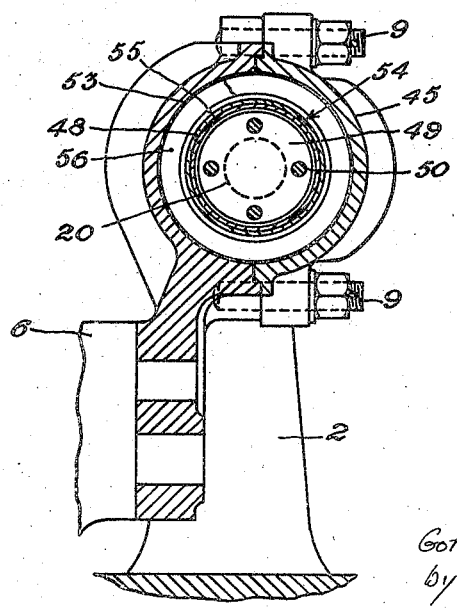

Patented Feb. 15, 1938

2,108,382

UNITED STATES PATENT OFFICE 2,108,382

INDIVIDUAL AXLE DRIVE FOR VEHICLES

Gottlieb Meyfarth, Geneva, Switzerland, assignor of one-half to Société Anonyme des Ateliers de Sécheron, Geneva, Switzerland, a corporation of Switzerland Application May 13, 1935, Serial No. 21,235
In Switzerland May 26, 1934

5 Claims. (Cl. 64—27)

The present invention relates to an individual axle drive for vehicles having a spring coupling, possessing a plurality of coupling elements employing tangentially arranged flat spiral springs inserted without preliminary tension, or cylindrical helical springs inserted with preliminary tension.

The individual axle drive for vehicles according to the invention differs from similar known individual axle drives by the fact that each coupling element has an axially guiding coupling member and an axially guided transmission device, between which a coupling spring is directly operative. The result of this is that the coupling spring is stressed only in the direction of the axis common to both coupling members, although the construction is very simple.

Four forms of construction of the individual axle drive according to the invention are shown diagrammatically by way of example in the accompanying drawings, in which:

Figure 1 is a front view of a first form of construction,

Figure 2 is a part axial section thereof,

Figure 3 is an axial section through a part of the second form of construction,

Figure 4 is a view of a detail of this form of construction,

Figure 5 is an axial section through a part of the third form of construction,

Figure 6 is a part end view of the third form of construction,

Figure 7 is a part front view of the fourth form of construction, and

Figure 8 is a part axial section along the line VIII—VIII of Figure 7.

The wheel 2 (Figures 1 and 2) is fast on an axle 1 and is provided with sliding or thrust pieces 4 which are interchangeably secured by screws 5.

The power of the motor not shown is transmitted to the wheel 2 through a hollow shaft 6 surrounding the axle and rigidly connected with a plurality of spring housings 7. The latter serve for the guiding of transmission devices 8, 11, 12, 14, 16 in the axial direction, the said devices comprising in each case the following parts: a core bolt 8 screw-threaded at both ends, two sliding heads 12, 14, likewise screw-threaded, and two clamping sleeves 11, 16 mounted on the bolt. The inner turn of the symmetrical flat spiral spring 10, which is inserted without preliminary tension, is accordingly held firmly between the two clamping sleeves 11, 16 which are pushed against each other by the sliding heads 12, 14, while the outer turn of the said spring is rigidly held in the housing 7. The latter is in two parts, and both parts are connected together by screws 9. The sliding pieces 4 have flat sliding surfaces, while the sliding heads 12, 14 are spherical, the diameter of the spherical surfaces being substantially equal to the distance between the sliding pieces 4.

The torque is transmitted from the hollow shaft 6 through the spring housings 7, the flat spiral springs 10, the transmission devices 8, 11, 12, 14, 16 resiliently in both directions of rotation to the driving wheel 2, the axial and to some extent also the vertical displacements of the hollow shaft 6 being rendered possible by the sliding of the sliding heads 12, 14 on the sliding pieces 4. The guide surfaces of the sleeves 11, 16 in the spring housing 7 are far apart, so that in combination with the rounded sliding heads 12, 14, tilting or binding of the parts of the transmission device cannot take place.

In the second form of construction (Figure 3), the power of the motor is likewise transmitted to the wheel through a plurality of coupling elements. The transmission devices of the latter each comprise a screw-threaded core-bolt 18, two internally screw-threaded sleeves 19 guided in the housing 7, two thrust plungers 20 and two thrust plates 21 interchangeably connected with the wheel 2. The inner turn of the flat spiral spring 18 is held firmly on the core-bolt 18 between the guide sleeves 19. The said core-bolt and the thrust plates 21 are provided with sockets 22, 23 for receiving the heads 24 of the thrust plungers 20. The contact surfaces 26 of the heads 24 are spherical and preferably have a diameter of curvature $d$ which is substantially equal to the length $l$ of the thrust plungers (Figure 4). The contact surfaces 26a of the sockets 22, 23 are likewise spherical and have a diameter of curvature which is greater than that of the contact surfaces 26. This diameter of curvature of the contact surfaces 26a is infinitely large, if no small play is assumed between the contact surfaces 26, 26a, and is finite, if it is assumed that there is such a small play, for example 0,5 mm. In practice, this play is always present. In this way, the contact surfaces 26, 26a roll on each other without sliding, so that the mobility of the parts in a non-sliding and frictionless manner is ensured in all directions at right-angles to or substantially at right-angles to the axis of the elements and lubrication is unnecessary. In the case of the small play, the contact surfaces are not in contact in a single point, but practically on a small surface, so that the specific pressure between the head and socket is smaller. The transmission device is protected against dirt by the spring housing 7 and the bellows 25 connecting the pressure plates 21.

In the last form of construction but one, (Figures 5, 6), each coupling element is provided with a cylindrical helical spring 30, which is arranged around a core-piece 32 of the transmission device in a spring housing 31 connected with the hollow shaft. The transmission device, in addition to the core-piece 32, comprises as before the two thrust plungers 20 and the thrust plates 21, the thrust plunger heads 24 having spherical contact surfaces 26, the diameter of curvature of which is substantially equal to the length of the thrust plungers, while the sockets 22, 23 likewise have spherical contact surfaces 26a, the diameter of curvature of which is greater than the length of the thrust plunger, a small play between these contact surfaces being assumed.

The spring 30 is situated preferably with preliminary tension between radial inwardly and outwardly projecting teeth 34, 35 of the spring housing 31 and of the core-piece 32, the peripheral lengths of which are such that these teeth cannot come into engagement with each other. The teeth 34 of the spring housing 31 engage axial grooves 36 of the core piece 32 and thus ensure the axial guiding of the said core piece 32. In practice, the latter is made in two parts so that the spring 30 can be conveniently mounted thereon.

If the power of the motor, not shown, is to be transmitted for example in a clockwise direction to the wheel 2, the left-hand teeth 34 of the spring housing 31 press on the left-hand end of the helical spring 30 which in its turn pushes the right-hand teeth 35 of the core-piece 32 to the right, until the spring has been sufficiently compressed. From then onward, the movement of the spring housing 31 is transmitted to the wheel 2 by the right-hand thrust plunger and the right-hand thrust plate. The operation is similar when the motor rotates in the opposite direction.

It should be noted that the core-piece 32 in the spring housing 31 is guided securely by the left- and right-hand teeth 34 which lie far apart, and that the heads of the thrust plungers roll in the sockets. Hence, any tilting or binding of parts of the coupling elements is impossible.

In the fourth form of construction (Figures 7 and 8), the toothed wheel 6 is rigidly connected with a plurality of two-part spring housings 45, which have their parts secured by screws 9 and are provided with internal slide rings 46, made for example of hardened and machined steel. After assembling the two housing parts, the slide rings 46 are held by annular projections 47. Sliding in the said rings 46 is a core-bush 48 for example of hardened and machined steel, which is divided into two parts by a transverse plane, the parts being held together by thrust pieces 49 and bolts 50. In the inoperative position of the individual axle drive, internal annular uninterrupted faces 51 of the slide rings 46 and 52 of the core bush 48 are in two planes at right-angles to the axis of the spring housing; together with the inner peripheral surface 53 of the spring housing 45 and the outer peripheral surface 54 of the core-bush 48, they form a chamber 55, in which is arranged a powerful cylindrical helical spring 56 of rectangular cross-section, preferably inserted with preliminary compression. Its end turns bear simultaneously half on the annular uninterrupted surfaces 51 of the spring housing 45 and half on the annular uninterrupted surfaces 52 of the core-bush 48.

In addition to the core-bush 48 and the thrust pieces 49, the transmission device comprises, as before, the two thrust plungers 20 with spherical heads, each acting in one direction of rotation only, and the two thrust pieces 21 rigidly connected with the wheel.

The torque is transmitted by the toothed wheel 6 through the spring housings 45, the helical springs 56, the transmission device 49—48—20—21 resiliently in both directions of rotation to the driving wheel 2. If, for example, the toothed wheel 6 rotates in the clockwise direction, the spring housing 45 moves to the right relatively to the core-bush 48, still in frictional engagement with the driving wheel 2, and presses through the left-hand annular surface 51 against the left-hand end of the spring 56, which, in its turn, presses against the right-hand annular surface 52 of the core-bush 48 and moves it also to the right. This core-bush 48 now drives the driving wheel 2 by means of the right-hand plunger 20. The axial and to some extent also the vertical displacements of the hollow shaft, not shown, and of the toothed wheel 6 takes place by movement of the thrust plunger heads 24 in the sockets 23 of the thrust pieces 49, 21. The operation is similar when the toothed wheel 6 rotates in the opposite direction.

The core-bush 48 is axially guided in the spring housing 45 by surfaces of hard material which are situated far apart, so that the core-bush is guided securely. The thrust plunger heads 24 roll in the sockets 23. Tilting or binding of parts of the coupling elements is hence impossible.

Lubrication of the said sockets is not necessary.

The helical spring 56 is supported against the centrifugal force by the inner peripheral surface 55 of the spring housing 45, which surface may be so hard and may be machined so that the turns of the helical spring 56 can move along it without any appreciable friction or wear.

The spring housing 7, 31, 45 may be rigidly connected with the driven wheel 2 and the thrust pieces 4, 21 with the toothed wheel 6.

I claim:

1. In an individual axle drive for vehicles, comprising a spring coupling with a plurality of coupling elements, each of which comprises in combination a transmission device guided along its axis an axially guiding coupling member, and a tangentially arranged cylindrical helical coupling spring which is operative between the guiding member and the transmission device, the latter device comprising a core-piece round which the spring is arranged between projecting parts thereof and of the axial guiding coupling part, two thrust pieces rigidly connected to the other part to be coupled by the spring coupling and two thrust plungers connecting the core-piece with the thrust pieces and resting in sockets of said core-piece and of the thrust pieces.

2. In an individual axle drive for vehicles, comprising a spring coupling with a plurality of coupling elements, each of which comprises in combination a transmission device guided along its axis an axially guiding coupling member, and a tangentially arranged coupling spring which is operative between the guiding member and the transmission device, the latter device comprising a core-piece round which the spring is arranged, two thrust pieces rigidly connected with the other part to be coupled by the spring coupling and two thrust plungers connecting the core-piece with the thrust pieces, being each operative in one direction of rotation only, resting in sockets of the core-piece and of the thrust pieces and having spherical contact surfaces, the diameter of curvature of which is substantially equal to the length of the thrust plungers, while the sockets have likewise spherical contact surfaces, the diameter of curvature of which is greater than the length of the thrust plungers, whereby the mobility in a non-sliding and frictionless manner is ensured in all directions at right angles or substantially at right angles to the axis of the coupling element.

3. In an individual axle drive for vehicles, comprising a spring coupling with a plurality of coupling elements, each of which comprises in combination a transmission device guided along its axis an axially guiding coupling member, and a tangentially arranged coupling spring which is operative between the guiding member and the transmission device, the latter device comprising a core-piece round which the spring is arranged, two thrust pieces rigidly connected with the other part to be coupled by the spring coupling and two thrust plungers connecting the core-piece with the thrust pieces, being each operative in one direction of rotation only, resting in sockets of the core-piece and of the thrust pieces and having spherical contact surfaces, the diameter of curvature of which is substantially equal to the length of the thrust plungers, while the sockets have likewise spherical contact surfaces, the diameter of curvature of which is infinitely large, whereby the mobility in a non-sliding and frictionless manner is ensured in all directions at right angles or substantially at right angles to the axis of the coupling element.

4. In an individual axle drive for vehicles, comprising a spring coupling with a plurality of coupling elements, each of which comprises in combination a transmission device guided along its axis an axially guiding coupling member, and a tangentially arranged cylindrical helical coupling spring which is operative between the guiding member and the transmission device, the latter device comprising a core-piece round which the spring is arranged between projecting parts thereof and of the axially guiding coupling part, two thrust pieces rigidly connected to the other part to be coupled by the spring coupling and two thrust plungers connecting the core-piece with the thrust pieces and resting in sockets of said core-piece and of the thrust pieces, the projecting parts of the axially guiding member being carried in axial guides of the core-piece and hence securing the axial guiding of the transmission device.

5. In an individual axle drive for vehicles, comprising a spring coupling with a plurality of coupling elements, each of which comprises in combination a transmission device guided along its axis an axially guiding member, and a tangentially arranged cylindrical helical coupling spring which is operative between the guiding member and the transmission device, said spring being simultaneously supported on annular uninterrupted surfaces of the axially guiding coupling member and of the transmission device, a core-piece of the latter device being guided axially at both ends by annular uninterrupted surfaces of the axially guiding member.

GOTTLIEB MEYFARTH.